US010859424B2

(12) United States Patent
van Voorst et al.

(10) Patent No.: US 10,859,424 B2
(45) Date of Patent: Dec. 8, 2020

(54) FLOWMETER HAVING A FITTING ASSEMBLY WITH DRAINAGE RESERVOIR, TAP, AND PLUG

(71) Applicant: Illinois Tool Works Inc., Glenview, IL (US)

(72) Inventors: Jan Willem van Voorst, Glenview, IL (US); Jan Willem van Rijswijk, Glenview, IL (US)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 172 days.

(21) Appl. No.: 16/036,653

(22) Filed: Jul. 16, 2018

(65) Prior Publication Data
US 2020/0018631 A1    Jan. 16, 2020

(51) Int. Cl.
*G01F 23/30* (2006.01)
*G01F 23/02* (2006.01)
*G01F 25/00* (2006.01)

(52) U.S. Cl.
CPC ............ *G01F 23/30* (2013.01); *G01F 23/02* (2013.01); *G01F 25/0007* (2013.01)

(58) Field of Classification Search
CPC .......... G01F 1/005; G01F 23/02; G01F 23/30; G01F 25/0007

USPC ........................................ 73/1.16, 1.33, 273
See application file for complete search history.

(56) References Cited

U.S. PATENT DOCUMENTS 2,321,041 A    6/1943  Porter
5,187,972 A *  2/1993  DeFriez ............. G01N 33/0011
                                                    73/23.2

FOREIGN PATENT DOCUMENTS

JP     02285218 A  * 11/1990  ............... G01F 1/22
JP     H02285218 A   11/1990

OTHER PUBLICATIONS

International Search Report and Written Opinion dated Sep. 26, 2019, issued in related International Application No. PCT/US2019/041709.

* cited by examiner

*Primary Examiner* — Benjamin R Schmitt
(74) *Attorney, Agent, or Firm* — McGuireWoods LLP

(57) ABSTRACT

A flowmeter with a drainable fitting assemble is presented. The flowmeter includes an inner tube providing a flow path for pressurized fluid, a housing assembly for receiving the inner tube, and a fitting assembly for securing the inner conduit and the housing assembly in-line within a pipeline path. The fitting assembly includes a tap for draining the reservoir fitting of liquid. The tap can mateable with either a removable or adjustable plug.

20 Claims, 3 Drawing Sheets

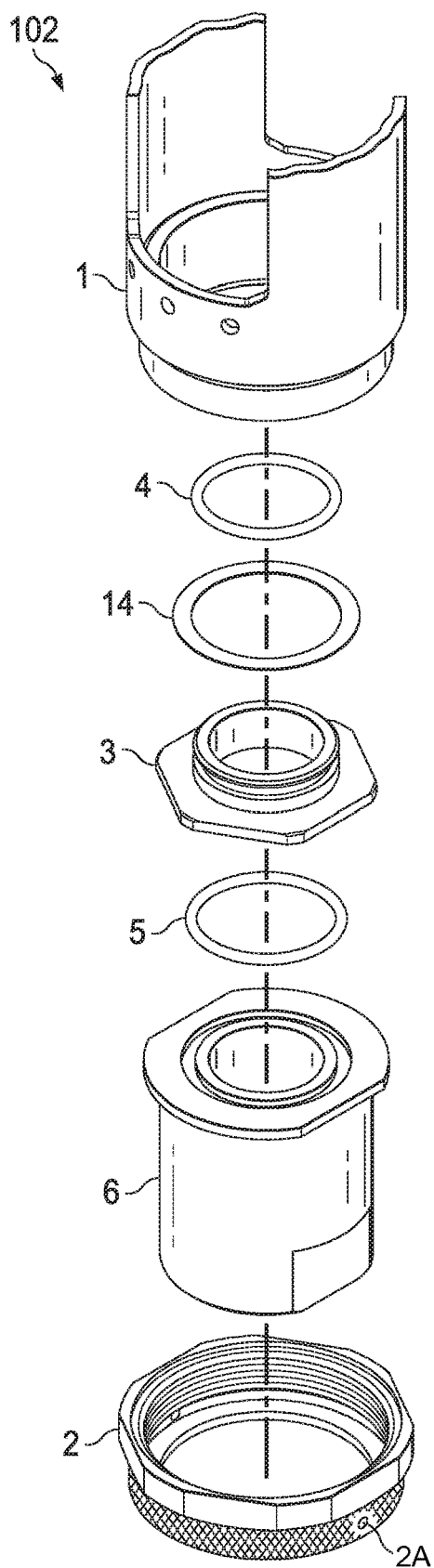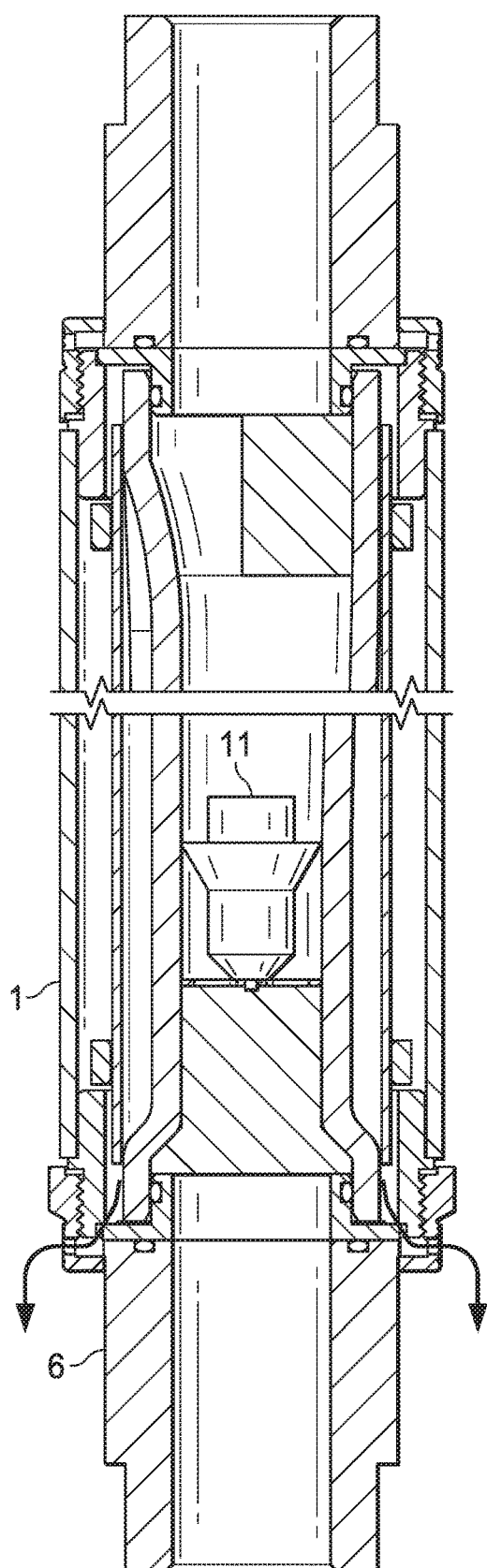
FIG. 3A
FIG. 3B

FLOWMETER HAVING A FITTING ASSEMBLY WITH DRAINAGE RESERVOIR, TAP, AND PLUG

TECHNICAL FIELD OF THE DISCLOSURE

The present disclosure relates, in general, to flowmeters for measuring flow rate of fluid through a flow path and having a fitting assembly for securely fixing the flowmeter to a flow path and, in particular, to a flowmeter having fitting assembly with a drainage reservoir and a tap and plug for draining the reservoir.

BACKGROUND

Flowmeters are used in all kinds of system processes. Flowmeters can be used to measure flow rate of fluid flowing through a pipe, for example to monitor flow rate of a fluid at a critical juncture in a manufacturing or fabrication process. Flowmeters are a window into the internal working of complicated system processes and can be a first indicator when something is going wrong in a process. Maintaining the flowmeter in a proper functioning state can be critical to some manufacturing and fabrication processes. The types of systems and the environmental conditions for which these flowmeters are used can be various, distinct, and dynamic. Flowmeters can be a complicated product made of many parts. Once assembled and delivered for use in the field, the product is typically installed and used without requiring too much assembly and configuration by the user. Any kind of calibration or maintenance to the flowmeter requires a certain amount of skill by a skilled technician or the manufacture. Due to the complexities of the flowmeters, the dynamics of the systems and the environments in which they are used, and its critical role within a process, a need exists for a more maintenance friendly version of the flowmeter.

SUMMARY

In an embodiment, a flowmeter having a drainable fitting assembly is presented. The flowmeter includes an inner tube providing a flow path for pressurized fluid; a housing assembly for receiving the inner conduit; and a fitting assembly for securing the inner conduit and the housing assembly in-line within a pipeline path; wherein the fitting assembly includes a tap for draining the reservoir fitting of trapped fluid.

In yet another embodiment, a flowmeter having a drainable fitting assembly and an adjustable protective shield is presented. The flowmeter can include an inner tube providing a flow path for pressurized fluid wherein a floater in the flow path provides indication of the flow rate of the fluid in the flow path; a protective shield having a plurality of markers providing a visible indicator of the flow rate of the pressurized fluid according to the position of the float in the flow path; a housing assembly for receiving the inner tube; and a fitting assembly for securing the inner tube and the housing assembly in-line within a pipeline path; wherein the fitting assembly includes a tap for draining the reservoir fitting of liquid received from the housing assembly; wherein the flowmeter can be calibrated by adjusting the position of the protective shield.

In the embodiments, the flowmeter can include a floater in the flow path wherein the floater provides indication of the flow rate in the flow path; and a protective shield having a plurality of markers providing a visible indicator of the flow rate of the pressurized fluid according to the position of the float in the flow path. The protective shield can be an intermediate conduit for receiving the inner conduit. The protective shield can be made of polycarbonate. The flowmeter can be calibrated by adjusting the position of the protective shield while in-line within the pipeline path. The housing assembly can include a window made of polycarbonate. The tap can be coupleable with a plug and can be removable or adjustable.

Additional embodiments, advantages, and novel features are set forth in the detailed description.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIG. 3A is an illustration of an isometric, exploded, and a partial view of a flowmeter housing and fitting assembly with drainage reservoir, tap, and plug, in accordance with certain example embodiments; and FIG. 3B is an illustration of a cut away and partial view of the housing assembly and fitting assembly, according to certain example embodiments.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

Figure 1:
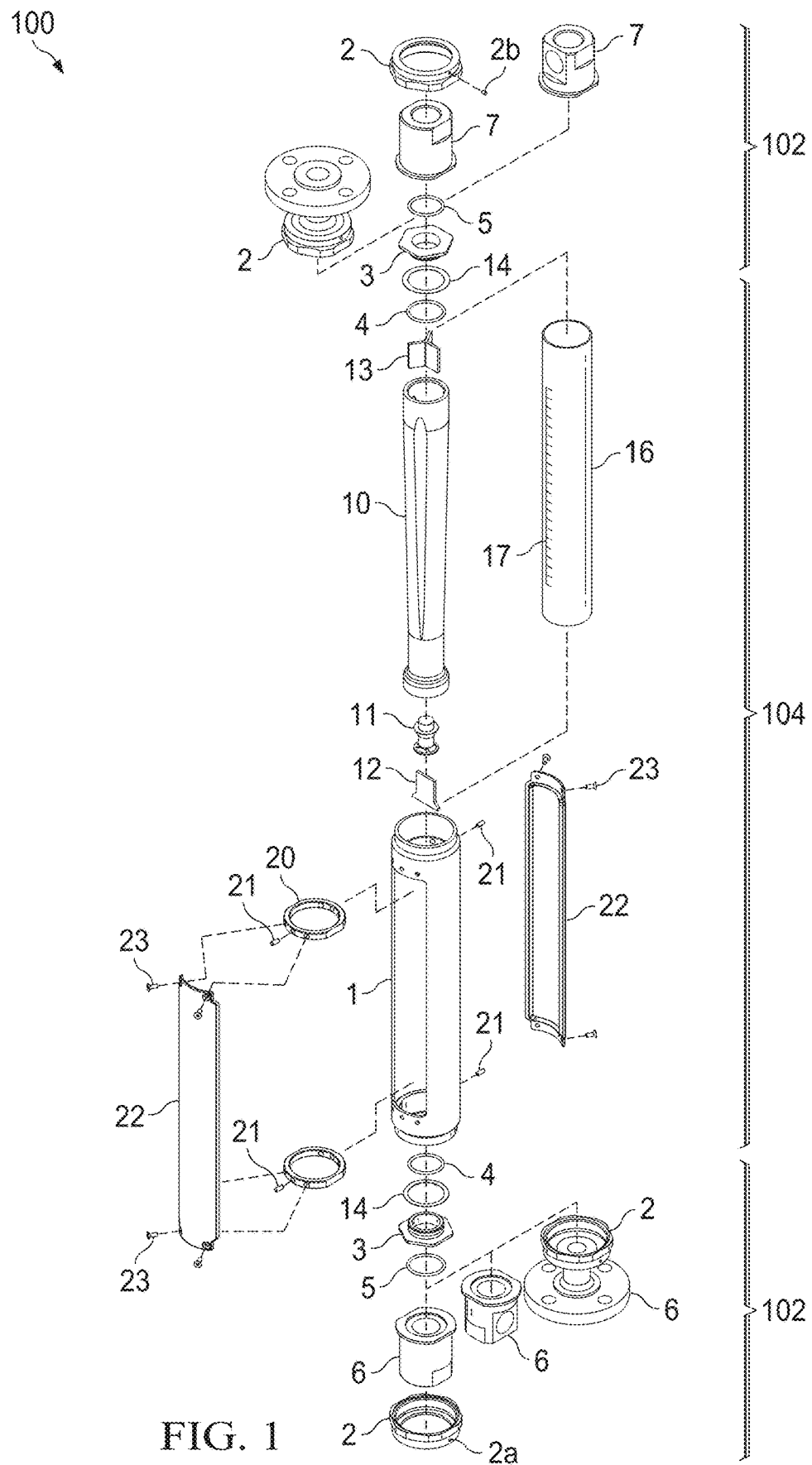
FIG. 1 is an illustration of an exploded view of a flowmeter, in accordance with certain example embodiments.

Referring now to FIG. 1, illustrated is an exploded view of a flowmeter, in accordance with certain example embodiments, denoted generally as 100. The flowmeter 100 includes upper and lower fitting assemblies 102 and a housing assembly 104. With this particular flowmeter model, the fitting assemblies 102 can include drainage reservoirs 2, taps 2a and plugs 2b, adaptors 3, elastomer O-rings 5, inlet/outlet process fittings 6, 7, fiber spacers 14, and elastomer O-rings 4. The process fitting 6, 7 can be of different configurations, including a vertical flange configuration. In FIG. 1, the vertical flange configuration includes the process fitting 6, 7 having the drainage reservoir 2 on top or bottom, depending on orientation. The taps 2a can be threaded or unthreaded and the plugs can be a screw or an unthreaded plug. The plugs can be completely removable or simply adjustable. A sealant can be used with the taps 2a and plugs 2b and the plugs 2b can be metal, plastic, or wood. Depending on the type and model of flowmeter, obviously both inlet and outlet process fittings 6, 7 wouldn't require a drainage reservoir 2. It should also be understood that the process fittings 6, 7 and the drainage reservoir can be an integrated piece, i.e. the process fittings 6, 7 can actually include the taps 2a and plugs 2b. The housing assembly 104 can include housing 1, tube 10, float 11, inlet float stop 12, outlet float stop 13, adjustable shield 16 with flow scales 17, slider rings 20 and fasteners 21, view shields 22 and fasteners 23. Tube 10 can be made of borosilicate glass and the shield with adjustable flow scale can be made of polycarbonate. The slider rings 20 can be made of plastic or metal.

Figure 2:
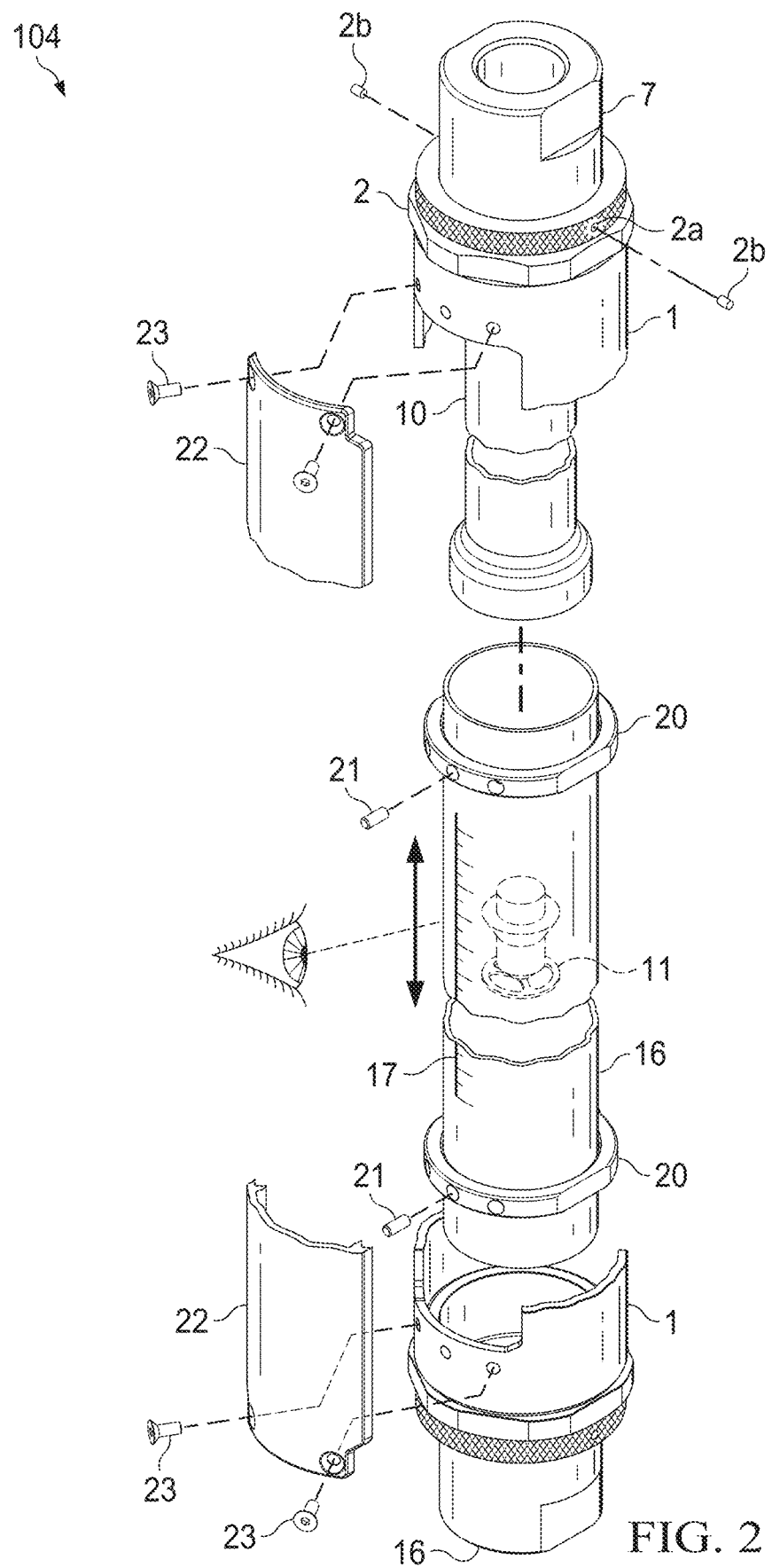
FIG. 2 is an illustration of a segmented view of an assembled flowmeter with protective shield having flow scales, in accordance with certain example embodiments.

Referring now to FIG. 2, illustrated is a segmented view of an assembled flowmeter 100 with protective shield having flow scales, in accordance with certain example embodiments. The flowmeter 100 includes the adjustable shield 16 with flow scales 17 that can be adjusted by manipulating fasteners 21, setting the shield in an adjusted position, and refastening the shield 16. The shield 16 can be adjusted to compensate for offsets in a production process. As such, systems that process fluids under a known offset can be compensated for by calibrating the shield with flow scale 16. In this manner, these system can still be accurately monitored using float 11.

Referring now FIGS. 3A and 3B, illustrated is an isometric, exploded, and a partial view of the housing assembly 1 and fitting assembly 102 and a cut away and partial view of the housing assembly 1 and fitting assembly 102 with drainage reservoir 2, respectively, of the flowmeter 100, in accordance with certain example embodiments. The drainage reservoir 2 includes tap 2a that can be unplugged to allow fluid to drain from the housing assembly 1 that may have collected during operation. In some operational settings, the flowmeter 100 may be exposed to the environment and/or certain operating conditions that can result in fluid, such as rain water or condensate, getting trapped in the body 1 of the housing, see the arrows in FIG. 3B. The captured fluid can get trapped between the housing 1, cap 2, process fitting 6, and the shield 16 and cause damage to the flowmeter 100 or parts therein. This can cause the flowmeter 100 to malfunction and, therefore, can become a potentially safety hazard. The trapped fluid, however, can be easily removed by using the drainage reservoir 2.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A flowmeter comprising:
    an inner tube providing a flow path for pressurized fluid;
    a housing assembly for receiving the inner tube; and
    a fitting assembly for securing the inner tube and the housing assembly in-line within a pipeline path;
    wherein the fitting assembly includes a drainage reservoir and a tap for draining fluid from between the drainage reservoir and the housing assembly.

2. The flowmeter of claim 1 further comprising a float in the flow path wherein the float provides indication of the flow rate in the flow path.

3. The flowmeter of claim 1 further comprising a protective shield having a plurality of markers providing a visible indicator of the pressure of the pressurized fluid according to the position of a float in the flow path.

4. The flowmeter of claim 3 wherein the protective shield is an intermediate tube for receiving the inner tube.

5. The flowmeter of claim 3 wherein the protective shield is made of polycarbonate.

6. The flowmeter of claim 3 wherein the flowmeter can be calibrated by adjusting the position of the protective shield while in-line within the pipeline path.

7. The flowmeter of claim 1 wherein the housing assembly includes a window made of polycarbonate.

8. The flowmeter of claim 1 further comprising a plug for mating with the tap.

9. The flowmeter of claim 1 further comprising another fitting assembly for securing the inner tube and the housing assembly in-line within another pipeline path, wherein the fitting assembly includes another tap for draining the other fitting assembly of fluid.

10. A flowmeter comprising:
    a housing assembly for receiving an inner tube; and
    a fitting assembly for securing the housing assembly in-line within a pipeline path;
    wherein the fitting assembly includes a reservoir fitting with a tap for draining fluid from between the reservoir fitting and the housing assembly.

11. The flowmeter of claim 10 further comprising a float in the flow path wherein the float provides indication of the flow rate in the flow path.

12. The flowmeter of claim 10 further comprising a protective shield having a plurality of markers providing a visible indicator of the pressure of the pressurized fluid according to the position of a float in the flow path.

13. The flowmeter of claim 12 wherein the protective shield is an intermediate tube for receiving the inner tube.

14. The flowmeter of claim 12 wherein the protective shield is made of polycarbonate.

15. The flowmeter of claim 12 wherein the flowmeter can be calibrated by adjusting the position of the protective shield while in-line within the pipeline path.

16. The flowmeter of claim 10 wherein the housing assembly includes a window made of polycarbonate.

17. The flowmeter of claim 10 further comprising a plug for mating with the tap.

18. The flowmeter of claim 10 further comprising another fitting assembly for securing the inner tube and the housing assembly in-line within another pipeline path, wherein the fitting assembly includes another reservoir fitting and tap for draining the other reservoir fitting of fluid.

19. A flowmeter comprising:
    an inner tube providing a flow path for pressurized fluid wherein a float in the flow path provides indication of the flow rate of the fluid in the flow path;
    a protective shield having a plurality of markers providing a visible indicator of the flow rate of the pressurized fluid according to the position of the float in the flow path;

a housing assembly for receiving the inner tube; and
a fitting assembly for securing the inner conduit and the housing assembly in-line within a pipeline path;
wherein the fitting assembly includes a drainage reservoir and a tap for draining fluid from between the drainage reservoir and the housing assembly;
wherein the flowmeter can be calibrated by adjusting the position of the protective shield.

20. The flowmeter of claim 19 wherein the tap is coupleable with a plug and the flowmeter can be calibrated by adjusting the position of the protective shield while in-line within the pipeline path.

\* \* \* \* \*